US011210522B2

(12) United States Patent
Jia et al.

(10) Patent No.: US 11,210,522 B2
(45) Date of Patent: Dec. 28, 2021

(54) SAMPLE EXTRACTION METHOD AND DEVICE TARGETING VIDEO CLASSIFICATION PROBLEM

(71) Applicant: BOE TECHNOLOGY GROUP CO., LTD., Beijing (CN)

(72) Inventors: Honghong Jia, Beijing (CN); Jibo Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 158 days.

(21) Appl. No.: 16/537,565

(22) Filed: Aug. 10, 2019

(65) Prior Publication Data

US 2020/0210707 A1  Jul. 2, 2020

(30) Foreign Application Priority Data

Jan. 2, 2019  (CN) .......................... 201910001709.6

(51) Int. Cl.
*G06K 9/00* (2006.01)
*G06K 9/62* (2006.01)
*G06K 9/46* (2006.01)

(52) U.S. Cl.
CPC .......... *G06K 9/00718* (2013.01); *G06K 9/46* (2013.01); *G06K 9/6215* (2013.01); *G06K 9/6256* (2013.01)

(58) Field of Classification Search
None
See application file for complete search history.

(56) References Cited

U.S. PATENT DOCUMENTS

| 7,110,458 | B2 * | 9/2006 | Divakaran | ......... | G06K 9/00711 375/240.25 |
| 7,333,712 | B2 * | 2/2008 | Jeannin | ................ | G11B 27/005 386/343 |
| 2008/0095451 | A1 * | 4/2008 | Nakamura | ........... | H04N 19/577 382/232 |
| 2012/0099793 | A1 * | 4/2012 | Kumar | ............... | G06K 9/00751 382/190 |

(Continued)

FOREIGN PATENT DOCUMENTS

| CN | 101398855 | 4/2009 |
| CN | 106503723 | 3/2017 |
| CN | 106599789 | 4/2017 |

(Continued)

OTHER PUBLICATIONS

Wang, Video Summarization by redundancy removing and Content ranking—Proceedings of the 15th international conference on Multimedia, pp. 577-580, 2007) (Year: 2007).*

(Continued)

*Primary Examiner* — Oneal R Mistry
*Assistant Examiner* — Nicolas James Boyajian
(74) *Attorney, Agent, or Firm* — Thomas | Horstemeyer, LLP

(57) ABSTRACT

A sample extraction method targeting a video classification problem includes acquiring video data, parsing the video data to obtain a plurality of consecutive single-frame images corresponding to the video data, and extracting feature images from the plurality of consecutive single-frame images to compose samples, where the feature images are used to summarize content information of the video data, and the samples do not contain redundant image data.

20 Claims, 3 Drawing Sheets

(56) References Cited

U.S. PATENT DOCUMENTS

2018/0165521 A1    6/2018    Yamamoto et al.

FOREIGN PATENT DOCUMENTS

CN    107330362    11/2017
CN    108171222    6/2018

OTHER PUBLICATIONS

Wang, "Video Summarization by redundancy removing and content ranking", 2007, Proceedings of the 15th international conference on multimedia, pp. 577-580 (Year: 2007).*

1st Office Action dated May 20, 2020 for Chinese Patent Application No. 201910001709.6.

Xiang; et al. "Key frame extraction algorithm based on image similarity" School of Computer Science and Engineering, University of Electronic Science and Technology of China, Chengdu, Sichuan 610054.

* cited by examiner

SAMPLE EXTRACTION METHOD AND DEVICE TARGETING VIDEO CLASSIFICATION PROBLEM

CROSS-REFERENCE TO RELATED APPLICATIONS

The present application claims the benefit of and priority to Chinese Patent Application No. 201910001709.6 filed Jan. 2, 2019, where the entire contents of which are incorporated herein by reference.

TECHNICAL FIELD

The present disclosure relates to the field of video classification technology and, in particular, to a sample extraction method and a sample extraction device targeting a video classification problem.

BACKGROUND

With the rise of deep learning based on GPUs, video classification has also become easier to implement. Today's video classification usually refers to video classification based on deep learning. Video classification relies on a large data set. To implement video classification in a general field, tens of thousands, or even hundreds of thousands of databases, may not be sufficient for training video classification models. Therefore, the existing classification mainly is to train a deep learning-based video classification model applied to a subdivision field. Since this can focus the video classification only on a specific scene, it is relatively easy to collect sufficient video data for training, such as collecting video data that matches a specific scene from a video library, such as a motion recognition library or a gesture recognition library.

Currently, a video is usually decomposed into consecutive video frames and a specified number of consecutive video frames are taken out as samples to collect a large number of such samples as training data for training a deep learning-based video classification model. However, since the above samples are equivalent to a segment of a video, it is likely that the segment does not adequately cover the content information of the entire video, and thus, when samples corresponding to a large amount of video data are collected, the qualities of the samples are also not uniform, which is not desirable for the training of the model.

It is to be noted that the above information disclosed in this Background section is only for enhancement of understanding of the background of the present disclosure, and therefore, it may contain information that does not form the prior art that is already known to a person of ordinary skill in the art.

SUMMARY

The present disclosure provides a sample extraction method and a sample extraction device targeting a video classification problem.

In one aspect, the present disclosure provides a sample extraction method targeting a video classification problem, the method including:
acquiring video data;
parsing the video data to obtain a plurality of consecutive single-frame images corresponding to the video data; and
extracting feature images from the plurality of consecutive single-frame images to compose samples, wherein the feature images are used to summarize content information of the video data, and the samples do not contain redundant image data.

In an exemplary embodiment, the method further includes:
arranging the feature images in chronological order according to optical flow information corresponding to the feature images on the time axis;
generating optical flow images corresponding to the samples according to an arrangement order of the feature images;
adding the optical flow images to training samples; and/or
adding the feature images to the training samples.

In an exemplary embodiment, extracting feature images from the plurality of consecutive single-frame images to compose samples includes:
dividing the consecutive plurality of single-frame images corresponding to the video data into a plurality of image groups, wherein the image group includes a plurality of consecutive single-frame images arranged in chronological order;
determining feature images corresponding to the image group by comparing structural similarities between the single-frame images in the image group; and
extracting feature images corresponding to each of the image groups to compose samples.

In an exemplary embodiment, determining feature images corresponding to the image group by comparing structural similarities between the single-frame images in the image group includes:
selecting any single-frame image in the image group as a benchmark image;
acquiring H single-frame images prior to the benchmark image and H single-frame images after the benchmark image according to the arrangement order of the plurality of single-frame images in the image group to form an image set, where H is a positive integer, and 2H+1 is less than the total number of single-frame images contained in one image group;
separately calculating a structural similarity between the benchmark image and each single-frame image in the image set to obtain a plurality of similarity values corresponding to the benchmark image;
performing an averaging operation on the plurality of similarity values corresponding to the benchmark image to obtain an average value of the similarities corresponding to the benchmark image;
sorting the average values of the similarities corresponding to a plurality of benchmark images according to the values from small to large;
selecting top M average values of similarities from the average values of similarities corresponding to the plurality of benchmark images, according to the values from small to large, where M is a positive integer and is less than a total number of single-frame images contained in one image group; and
determining benchmark images corresponding to the selected averages of the similarities as feature images.

In an exemplary embodiment, after extracting feature images corresponding to each of the image groups to compose samples is performed for the present time, the method further includes:
marking the feature images extracted for the present time; and
extracting feature images from single-frame images that are not marked in the image group when extracting feature images corresponding to each of the image groups to compose samples is performed for the next time.

In an exemplary embodiment, after extracting feature images corresponding to each of the image groups to compose samples is performed for the present time, the method further includes:

marking the feature images extracted for the present time; and when extracting feature images corresponding to each of the image groups to compose samples is performed for the next time, respectively multiplying the average values of the similarities corresponding to the marked feature images by a growth coefficient, the growth coefficient being used to double the average values of the similarities corresponding to the feature images.

In order to achieve the above object, a non-transitory computer-readable storage medium is provided, the storage medium including a stored program, wherein when the program is executed, the device where the storage medium is located implements the sample extraction method targeting a video classification problem described above.

In order to achieve the above object, according to another aspect of the present invention, there is provided a processor for executing a program, wherein the program is executed to implement a sample extraction method targeting a video classification problem described above.

In another aspect, the present disclosure provides a sample extraction device targeting a video classification problem, the device including:

an acquiring unit configured to acquire video data;

a parsing unit configured to parse the video data acquired by the acquiring unit to obtain a plurality of consecutive single-frame images corresponding to the video data; and an extracting unit configured to extract feature images from the plurality of consecutive single-frame images obtained by the parsing unit to compose samples, wherein the feature images are used to summarize content information of the video data, and the samples do not contain redundant image data.

In an exemplary embodiment, the device further includes:

a sorting unit configured to arrange the feature images in chronological order according to optical flow information corresponding to the feature images on the time axis;

a generating unit configured to generate optical flow images corresponding to the samples according to an arrangement order of the feature images arranged by the sorting unit;

an adding unit configured to add the optical flow images to training samples; and/or the adding unit further configured to add the feature images to the training samples.

In an exemplary embodiment, the extracting unit includes:

a decomposition module configured to divide the consecutive plurality of single-frame images corresponding to the video data into a plurality of image groups, wherein the image group includes a plurality of consecutive single-frame images arranged in chronological order;

a determining module configured to determine feature images corresponding to the image group by comparing structural similarities between the single-frame images in the image group; and extract feature images corresponding to each of the image groups to compose samples.

In an exemplary embodiment, the determining module includes:

a selecting sub-module configured to select any single-frame image in the image group as a benchmark image;

an acquiring sub-module configured to acquire H single-frame images prior to the benchmark image and H single-frame images after the benchmark image according to the arrangement order of the plurality of single-frame images in the image group to form an image set, where H is a positive integer, and 2H+1 is less than the total number of single-frame images contained in one image group;

a calculating sub-module configured to separately calculate a structural similarity between the benchmark image and each single-frame image in the image set to obtain a plurality of similarity values corresponding to the benchmark image;

the calculating sub-module further configured to perform an averaging operation on the plurality of similarity values corresponding to the benchmark image to obtain an average value of the similarities corresponding to the benchmark image;

a sorting sub-module configured to sort the average values of the similarities corresponding to a plurality of benchmark images, which are calculated by the calculating sub-module, according to the values from small to large;

the selecting sub-module further configured to select top M average values of similarities from the average values of similarities corresponding to the plurality of benchmark images, according to the values from small to large as sorted by the sorting sub-module, where M is a positive integer and is less than a total number of single-frame images contained in one image group; and the determining sub-module configured to determine benchmark images corresponding to the selected averages of the similarities as feature images.

In an exemplary embodiment, the extracting unit further includes:

a marking module configured to mark the feature images extracted for the present time after extracting feature images corresponding to each of the image groups to compose samples is performed for the present time; and an extracting module configured to extract feature images from single-frame images that are not marked in the image group when extracting feature images corresponding to each of the image groups to compose samples is performed for the next time.

In an exemplary embodiment, the determining module further includes:

a marking sub-module configured to mark the feature images extracted for the present time after extracting feature images corresponding to each of the image groups to compose samples is performed for the present time; and a processing sub-module configured to, when extracting feature images corresponding to each of the image groups to compose samples is performed for the next time, respectively multiply the average values of the similarities corresponding to the marked feature images by a growth coefficient, the growth coefficient being used to double the average values of the similarities corresponding to the feature images.

The above description is only an overview of the technical solutions of the present disclosure, and the above-described and other objects, features, and advantages of the present disclosure can be more clearly understood. Specific embodiments of the present disclosure are set forth below.

BRIEF DESCRIPTION OF THE DRAWINGS

Various other advantages and benefits will become apparent to those of ordinary skill in the art from detailed description of the preferred embodiment below. The drawings are only for the illustrating the preferred embodiments and are not to be construed as limiting the present disclosure. Throughout the drawings, the same reference numerals are used to refer to the same parts. In the drawings.

DETAILED DESCRIPTION

Exemplary embodiments of the present disclosure will be described in more detail below with reference to the accompanying drawings. Although the present disclosure has been shown and described with reference to exemplary embodiments, it should be understood that the present disclosure may be embodied in various forms and should not be limited by the embodiments set forth herein. Rather, these embodiments are provided so that the present disclosure may be more fully understood and the scope of the present disclosure can be fully conveyed to those skilled in the art.

Figure 1:
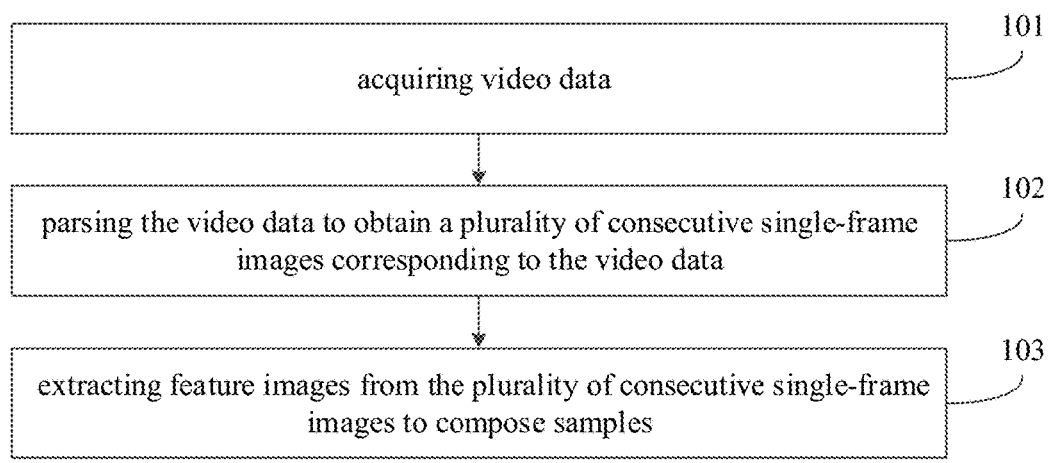
FIG. 1 is a flowchart of a sample extraction method targeting a video classification problem according to an embodiment of the present disclosure.

An embodiment of the present disclosure provides a sample extraction method targeting a video classification problem. As shown in FIG. 1, the method extracts feature images which can summarize content information of the video data, from a plurality of consecutive single-frame images corresponding to the video data to compose samples. Thus, it can ensure the quality of the samples. In this regard, the embodiment of the present disclosure provides the following specific steps.

In step 101, video data is acquired.

In the embodiment of the present disclosure, the video data may be regarded as a source of sample data, from which samples are selected to serve as training data, so as to train the video classification model based on deep learning. Therefore, a video data more useful for training the model should be acquired. Thus, in the embodiment of the present disclosure, the video data is not randomly acquired from a mass data source, but is extracted from a preprocessed video library. For example, if the action classification in the video classification is focused, the sample data source for training the video classification model can be acquired from the UCF101 action library.

In step 102, the video data is parsed to obtain a plurality of consecutive signal-frame images corresponding to the video data.

The single-frame image refers to a still picture, and the frame is the single-image picture of the smallest unit in the video images, which is equivalent to each shot of the video images, and the consecutive frames form the video images.

In the embodiment of the present disclosure, the video data is decomposed into a series of consecutive single-frame still pictures by parsing the video data for analyzing the entire video data by analyzing the still pictures of each single frame. For example, a segment of video data can be parsed into 24 frames per second. For the embodiment of the present disclosure, the method for parsing video into a plurality of single-frame images is not limited.

In step 103, feature images are extracted from the plurality of consecutive single-frame images to compose samples.

A feature image is used to summarize content information of the video data. For example, in the video data shown in FIG. 2a and the corresponding optical flow information, as can be seen from analyzing FIG. 2, the first, third, and seventh single-frame images in the segment of video data can summarize the content information of the segment of video data, and therefore, such single-frame images are the feature images corresponding to the segment of video data. While for the segment of the dynamic video data, the second, fourth, fifth, sixth, and eighth single-frame images have minor difference between one another. For the naked eye observation, the five single-frame images are almost the same, and such a single-frame image is the redundant image data corresponding to the segment of video data.

For the embodiment of the present disclosure, in the range of a plurality of consecutive signal-frame images corresponding to the video data, each feature image is significantly different from other single-frame images, and then the plurality of feature images are extracted to compose samples which can summarize content information of the video data and do not contain redundant image data.

Figure 2A:
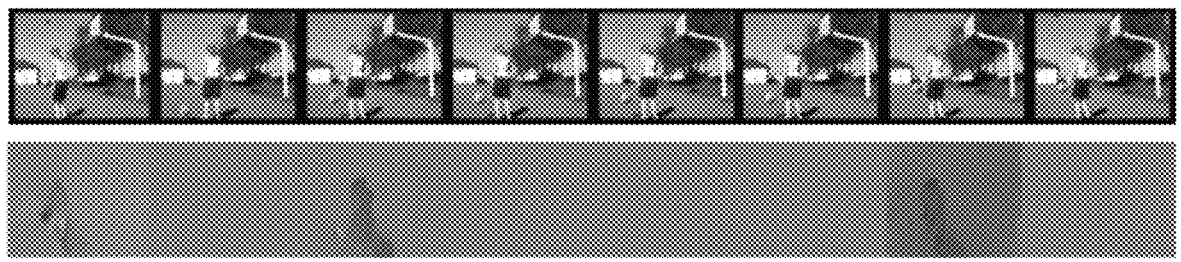
FIG. 2a is a plurality of consecutive single-frame images and corresponding optical flow images according to an embodiment of the present disclosure.
Figure 2B:
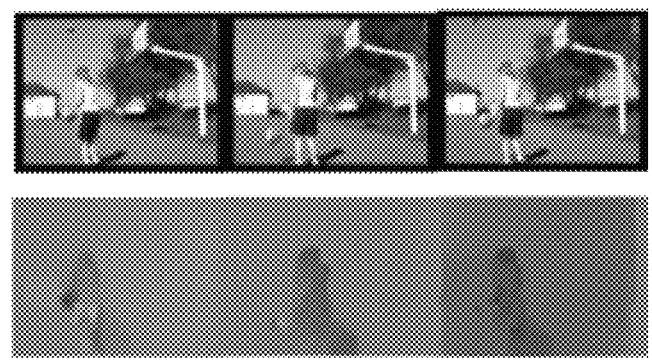
FIG. 2b is a schematic diagram showing the effect of composing a sample from a feature image.

For example, the above example is further described, and the feature images are extracted from FIG. 2a to form samples as shown in the schematic diagram of the effect in FIG. 2b. Each single-frame image in the samples is significantly different from others, and correspondingly, a clearer and more efficient optical flow diagram can also be obtained from the feature images contained in the samples.

A sample extraction method targeting a video classification problem is provided in the embodiment of the present disclosure. In the embodiment of the present disclosure, the acquired video data is parsed to obtain corresponding consecutive single-frame images in advance, and then, the feature images are extracted from the consecutive single-frame images to compose samples, such that the composed samples do not contain redundant image data. Compared with the prior art, this can solve the problem that the qualities of samples are not uniform and are not conducive to model training. In the embodiments of the present disclosure, feature video frames included in a video data are extracted to form samples, which can ensure that the samples can cover the entire content information of the video data, and also can avoid redundant image data included in the samples to enhance sample quality, and also contribute to improve the training quality of the video classification model.

Figure 3:
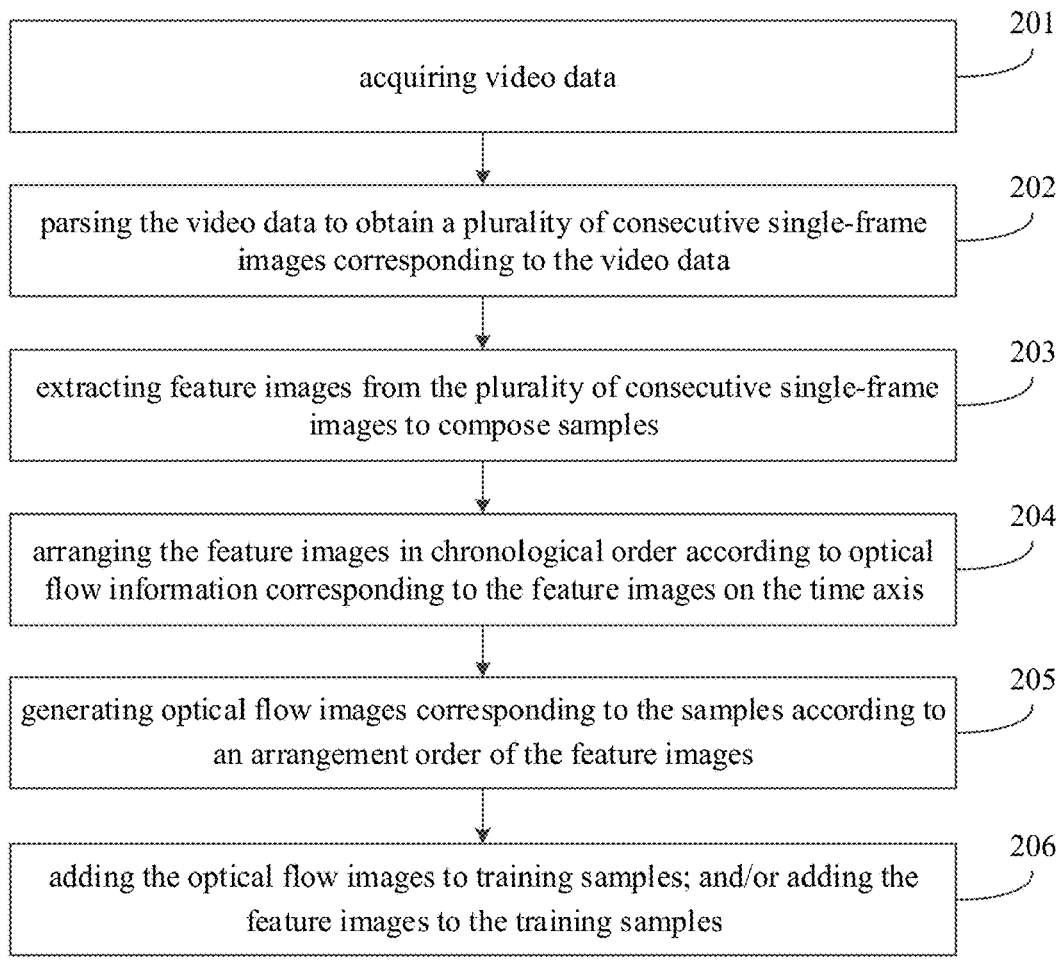
FIG. 3 is a flowchart of another sample extraction method targeting a video classification problem according to an embodiment of the present disclosure.

In order to explain the above embodiments in more detail, the embodiment of the present disclosure further provides another sample extraction method targeting a video classification problem. As shown in FIG. 3, after obtaining samples composed of feature images, optical flow images corresponding to the samples may be generated, so as to add the samples, the corresponding optical flow images, and the image data in combination of both to the training samples, as a data enhancement strategy. Thereby, a ratio of samples that can cover the content information of the entire video data in the training samples can be increased, which contributes to improve the accuracy of the training of the video classification model. In this regard, the embodiment of the present disclosure provides the following specific steps.

In step 201, video data is acquired.

In this embodiment of the present disclosure, this step may refer to step 101, and details are not repeated herein.

In step 202, the video data is parsed to obtain a plurality of consecutive signal-frame images corresponding to the video data.

In this embodiment of the present disclosure, this step may refer to step 102, and details are not repeated herein.

In step 203, feature images are extracted from the plurality of consecutive single-frame images to compose samples.

A feature image is used to summarize content information of the video data, so that redundant image data is not included in the sample.

In the embodiment of the present disclosure, a specific step of extracting feature images from the plurality of consecutive single-frame images to compose samples may be as follows.

First, the plurality of consecutive single-frame images corresponding to the video data are equally divided into a plurality of image groups, and one image group includes a plurality of consecutive single-frame images arranged in chronological order. Then, by comparing the structural similarities between the single-frame images in the image group, the feature images in each of the image groups are determined, and the feature images are extracted to compose samples.

It should be noted that, for the step of extracting the feature image, the main principle is to select the feature images by comparing and obtaining structural similarities between the single-frame images in the plurality of single-frame images corresponding to the video data. As the number of single-frame images corresponding to the video data can be very large (for example, more than 24 frames per second), a large number of single-frame images can be divided into a plurality of image groups to compare structural similarity between single-frame images within each of the image groups. Then, the feature images corresponding to each of the image groups are determined, so that the feature images corresponding to the video data are finally obtained by collecting the feature images corresponding to each group, thereby decomposing the original huge workload into multiple tasks, simplifying the process of extracting feature images. In addition, in the image grouping method proposed by the embodiment of the present disclosure, consecutive single-frame images are divided into groups according to the chronological order and the number of images in each of the image groups is the same, instead of arbitrarily grouping the single-frame images corresponding to the video data. This can ensure that the feature images corresponding to different image groups are also significantly different from each other, so as to avoid redundant image data in the feature images corresponding to the video data, thereby improving the accuracy of extracting the feature images corresponding to the video data.

Specifically, in the embodiment of the present disclosure, the specific steps of determining feature images corresponding to the image group by comparing the structural similarity between the single-frame images in the image group may be as follows.

In the first step, any one single-frame image is selected as a benchmark image in the image group, and is used to be compared with each of the other single-frame images in the image group to see if there is a structural similarity. In the embodiment of the present disclosure, each single-frame image in the image group can be taken as a benchmark image in turn, thereby completing the comparison between a plurality of single-frame images in the image group.

In the second step, according to the arrangement order of the plurality of single-frame images in the image group, H single-frame images prior to the benchmark image and H single-frame images after the benchmark image are acquired to form an image set, where H is a positive integer, and 2H+1 is less than the total number of single-frame images contained in one image group. The structural similarity between the benchmark image and each single-frame image in the image set is separately calculated to obtain a plurality of similarity values corresponding to the benchmark image. An averaging operation is performed on the plurality of similarity values corresponding to the benchmark image to obtain an average of the similarities corresponding to the benchmark image.

It should be noted that although for the embodiment of the present disclosure, each single-frame image in the image group can be used as a benchmark image in turn, since the redundant image data is usually consecutive single-frame images and, for example, two consecutive single-frame images are almost indistinguishable from the human eye. When comparing the structural similarities between single-frame images in an image group, it is not necessary to successively compare each single-frame image and the remaining single-frame images, which would otherwise include redundant comparison operations. Therefore, the embodiment of the present disclosure proposes an optimization scheme, that is, in an image group, one benchmark image is only compared with H single-frame images prior to the benchmark image and H single-frame images after the benchmark image. In the embodiment of the present disclosure, this can ensure the technical effect and also address the problem of saving calculation cost (e.g., computing resources). For, the optimization, H may be a positive integer between 1 and 10.

In the embodiment of the present disclosure, according to the description of the first step and the second step, the similarity average value corresponding to a benchmark image in the image group can be obtained by the following formula (1):

$$SSIM(i) = \frac{\sum_{H=1}^{H}(Ssim(f(i), f(i+H)) + Ssim(f(i), f(i-H)))}{2H} \quad \text{Formula (1)}$$

Where i is the benchmark image in the image group, that is, the i-th frame image, and H is the maximum adjacent frame threshold, Ssim(f(i), f(i+H)) is the structural similarity value between the i-th frame image and the (i+H)-th frame image, and SSIM(i) is the average of the similarities between the i-th single-frame image and the single-frame images within the adjacent frame threshold range H.

Further, it should be noted that the above is only a specific implementation method exemplified by the embodiment of the present disclosure. The main principle of the embodiment of the present disclosure is to compare a single-frame image with single-frame images prior to and after the single-frame image in an image group. Based on this, an average of the structural similarities between the single-frame image and other single-frame images within this range is further calculated. Therefore, when comparing the structure similarity, one single-frame image can be compared with a plurality of frames of images in a range prior to the single-frame image and in the same range after the single-frame image to obtain structure similarities, or one single-frame image can be compared with a plurality of frames of images in the range prior to the single-frame image and in a different range after the single-frame image to obtain structure similarities. For example, depending on the application scenario, for an image group of 30 frames of images, the 15th frame image is selected as the benchmark image, and the structural similarity between the benchmark image and 5 frames prior to the benchmark image and the structural similarity between the benchmark image and 9 frames after the benchmark image can be compared.

In the third step, the average values of the similarities of a plurality of benchmark images are sorted according to the values from small to large. Top M averages of the similarities are selected from the average values of the similarities of a plurality of benchmark images, where M is a positive integer and is smaller than the total number of single-frame images contained in one image group, and the benchmark images corresponding to the selected averages of the similarities are determined as feature images.

In the embodiment of the present disclosure, after obtaining the average value of the similarities corresponding to one benchmark image in the image group, based on the same principle, since single-frame image in the image group can be selected as the benchmark image in turn, average values of the similarities corresponding to the benchmark images in the image group can be obtained. The smaller the value of the average value of the similarities, the less similar the benchmark image is from H single-frame images prior to it and H single-frame images after it. Therefore, in the embodiment of the present disclosure, M smallest average values of similarities are selected from the average values of similarities corresponding to the benchmark images in the image group, then, according to the M smallest average values of similarities, the benchmark images least similar to H single-frame images prior to it and H single-frame images after it can be selected from the plurality of benchmark images to obtain the feature images corresponding to the image group.

In the embodiment of the present disclosure, according to the third step, the M smallest values may be selected from the average values of the similarity corresponding to the plurality of benchmark images through the following formula (2):

$$F = \sum_{1}^{K} (SMALL((SSIM(1), \ldots, SSIM(n)), M)) \quad \text{Formula (2)}$$

Where K is the number of image groups, H is the number of benchmark images of the image group, and the average value of the similarities of each benchmark image is SSIM (n). SMALL(.) selects M benchmark images having smallest average values of similarities from H frames of benchmark images, as feature images. F are samples composed of feature images corresponding to the plurality of image groups.

In the embodiment of the present disclosure, the feature images corresponding to the image group are determined through the first step to the third step, and the feature images corresponding to each of the image groups may compose the samples of the video data.

Further, in the embodiment of the present disclosure, for a piece of video data, by setting different positive integer values for the above H and M, correspondingly, the feature images extracted in one image group may be different, so the final composed samples corresponding to the video data can also be different. Therefore, after performing extracting feature images corresponding to each of the image groups for one time, the feature images are marked, so that when extracting feature images corresponding to each of the image groups to compose samples is performed for the next time, feature images are extracted from single-frame images that are not marked in the image group. Thus, it can avoid the same single-frame image being selected as feature images again. Therefore, the feature images contained in the composed samples each time can be different as possible as it could be, which can increase the diversity of the samples.

Further, in the embodiment of the present disclosure, an optimization method is further proposed for avoiding that the same single-frame image is selected as the feature image again, specifically, as follows.

After performing extracting feature images corresponding to each of the image groups to compose samples for a present time, the feature images extracted for the present time are marked. When extracting feature images corresponding to each of the image groups to compose samples is performed for the next time, the average values of the similarities corresponding to the marked feature images are respectively multiplied by a growth coefficient, which is used to double the average values of the similarities corresponding to the feature images. Further, when the average values of the M smallest values are selected from the average values of the similarities of the plurality of benchmark images, through the above method, the average values of the similarities of the benchmark images which were selected as feature images selected last time are doubled to prevent the benchmark images that were selected as feature images last time from being selected again.

In step 204, the feature images are arranged in chronological order according to optical flow information corresponding to the feature images on the time axis.

In step 205, the optical flow images corresponding to the samples are generated according to the arrangement order of the feature images.

In the embodiment of the present disclosure, steps 204-205 above describe how to generate corresponding optical flow images of the samples composed of the feature images.

In step 206, the optical flow images are added to the training samples and/or the feature images are added to the training samples.

The training samples are used for a video classification model based on deep learning.

In the embodiment of the present disclosure, the samples corresponding to the acquired video data, the optical flow images corresponding to the samples, and image data in combination of both are added to the training samples as a data enhancement strategy. Thereby, a ratio of samples that can cover the content information of the entire video data in the training samples can be increased, which contributes to improve the accuracy of the training of the video classification model.

In addition, for the samples corresponding to the video data acquired by the embodiment of the present disclosure can be used as training samples to directly train the training video classification model, or may be used as enhanced samples to test the video classification model that has been trained.

In order to achieve the above object, in accordance with another aspect of the present disclosure, an embodiment of the present disclosure further provides a storage medium, such as a non-transitory computer-readable storage medium, including a stored program, wherein, when the program is running, the storage medium is controlled to perform the sample extraction method targeting a video classification problem described above on a device.

In order to achieve the above object, in accordance with another aspect of the present disclosure, an embodiment of the present disclosure further provides a processor, such as a hardware processor, for running a program, wherein when the program is executed, the sample extraction method targeting a video classification problem is implemented.

Figure 4:
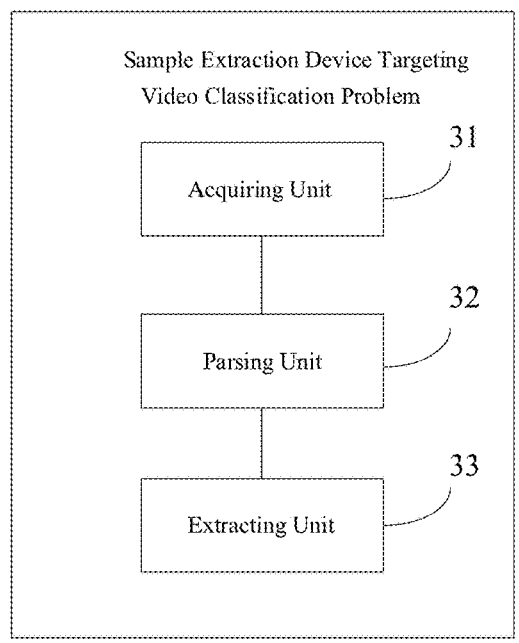
FIG. 4 is a structural block diagram of a sample extraction device targeting a video classification problem according to an embodiment of the present disclosure.

Further, as an implementation of the method shown in FIG. 1 and FIG. 2, an embodiment of the present disclosure provides a sample extraction device targeting a video classification problem. The device embodiment corresponds to the foregoing method embodiment. For brevity, details will not be repeated one by one for the device embodiment as in the method embodiments, but it should be understood that the device in this embodiment can implement all the functions of the above method. The device is applied to extract samples for training a video classification model from video data. As shown in FIG. 4, the device includes:

an acquiring unit 31 configured to acquire video data;

a parsing unit 32 configured to parse the video data acquired by the acquiring unit 31 to obtain a plurality of consecutive single-frame images corresponding to the video data; and an extracting unit 33 configured to extract feature images from the plurality of consecutive single-frame images obtained by the parsing unit 32 to compose samples, wherein the feature images are used to summarize content information of the video data, and the samples do not contain redundant image data.

Figure 5:
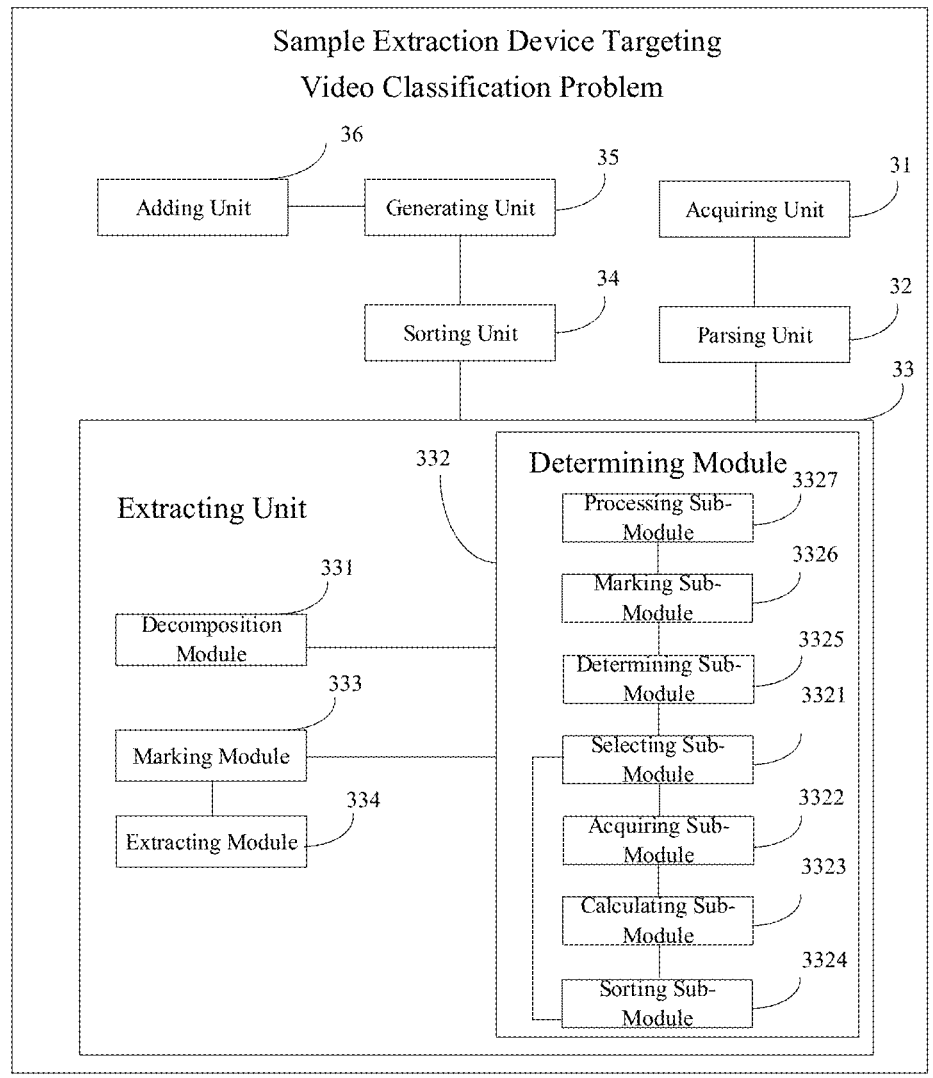
FIG. 5 is a structural block diagram of another sample extracting device targeting a video classification problem according to an embodiment of the present disclosure.

Further, as shown in FIG. 5, the device further includes:

a sorting unit 34 configured to arrange the feature images in chronological order according to optical flow information corresponding to the feature images on the time axis;

a generating unit 35 configured to generate optical flow images corresponding to the samples according to an arrangement order of the feature images arranged by the sorting unit 34;

an adding unit 36 configured to add the optical flow images to the training samples; and/or the adding unit 36 further configured to add the feature images to the training samples.

Further, as shown in FIG. 5, the extracting unit 33 includes:

a decomposition module 331 configured to divide the consecutive plurality of single-frame images corresponding to the video data into a plurality of image groups, wherein the image group includes a plurality of consecutive single-frame images arranged in chronological order;

a determining module 332 configured to determine feature images corresponding to the image group by comparing structural similarities between the single-frame images in the image group; and extract feature images corresponding to each of the image groups to compose samples.

Further, as shown in FIG. 5, the determining module 332 includes:

a selecting sub-module 3321 configured to select any single-frame image in the image group as a benchmark image;

an acquiring sub-module 3322 configured to acquire H single-frame images prior to the benchmark image and H single-frame images after the benchmark image according to the arrangement order of the plurality of single-frame images in the image group, to form an image set, where H is a positive integer, and 2H+1 is less than the total number of single-frame images contained in one image group;

a calculating sub-module 3323 configured to separately calculate a structural similarity between the benchmark image and each single-frame image in the image set to obtain a plurality of similarity values corresponding to the benchmark image;

the calculating sub-module 3323 further configured to perform an averaging operation on the plurality of similarity values corresponding to the benchmark image to obtain an average value of the similarities corresponding to the benchmark image;

a sorting sub-module 3324 configured to sort the average values of the similarities corresponding to a plurality of benchmark images, which are calculated by the calculating sub-module 3323, according to the values from small to large;

the selecting sub-module 3321 further configured to select top M average values of similarities from the average values of similarities corresponding to the plurality of benchmark images, according to the values from small to large as sorted by the sorting sub-module 3324, where M is a positive integer and is less than a total number of single-frame images contained in one image group; and a determining sub-module 3325 configured to determine benchmark images corresponding to the selected averages of the similarities as feature images.

Further, as shown in FIG. 5, the extracting unit 33 further includes:

a marking module 333 configured to mark the feature images extracted for the present time after extracting feature images corresponding to each of the image groups to compose samples is performed for the present time; and an extracting module 334 configured to extract feature images from single-frame images that are not marked in the image group when extracting feature images corresponding to each of the image groups to compose samples is performed for the next time.

Further, as shown in FIG. 5, the determining module 332 further includes:

a marking sub-module 3326 configured to mark the feature images extracted for the present time after extracting feature images corresponding to each of the image groups to compose samples is performed for the present time; and a processing sub-module 3327 configured to, when extracting feature images corresponding to each of the image groups to compose samples is performed for the next time, respectively multiply the average values of the similarities corresponding to the marked feature images by a growth coefficient, the growth coefficient being used to double the average values of the similarities corresponding to the feature images.

Accordingly, the present disclosure provides a sample extraction method and a sample extraction device targeting a video classification problem. In the embodiments of the present disclosure, the acquired video data is parsed to obtain corresponding consecutive single-frame images in advance, and then, the feature images are extracted from the consecutive single-frame images to compose samples, such that the composed samples do not contain redundant image data. Compared with the prior art, this can solve the problem that the qualities of samples are not uniform and are not conducive to model training. In the embodiments of the present disclosure, feature video frames included in a video data are extracted to form samples, which can ensure that the samples can cover the entire content information of the video data, and also can avoid redundant image data included in the samples, to enhance sample quality, and also contribute to improve the training quality of the video classification model. In addition, after obtaining samples composed of feature images, optical flow images corresponding to the samples may be generated so as to add the samples, the corresponding optical flow images, and the image data in combination of both to the training samples, as a data enhancement strategy. Thus, a ratio of samples that can cover the content information of the entire video data in the training samples can be increased, which contributes to improve the accuracy of the training of the video classification model.

The sample extraction device targeting a video classification problem includes a processor and a memory, and the above-mentioned acquiring unit, parsing unit, extracting unit, and the like are all stored as a program unit in a memory, and the processor executes the above-mentioned program unit stored in the memory to implement corresponding functions.

The processor contains a kernel, and the kernel invokes the corresponding program unit from the memory. The kernel can be provided one or more, optimize the method of extracting samples from the video data by adjusting the kernel parameters to ensure that the samples can cover the entire content information of the video data, and also can avoid redundant image data included in the samples, to enhance sample quality, and also contribute to improve the training quality of the video classification model.

The memory may include a non-persistent memory, a random access memory (RAM), and/or a non-volatile memory in a computer readable medium, such as a read only memory (ROM) or a flash memory (flash RAM), and the memory includes at least one memory chip.

An embodiment of the present disclosure provides an electronic device, including: a memory, a processor, and a program stored on the memory and operable on the processor. When the program is executed by the processor, the sample extraction method targeting a video classification problem is implemented.

An embodiment of the present disclosure provides a computer readable storage medium, on which a computer program is stored, which is characterized in that the program is executed to implement the sample extraction method targeting a video classification problem.

The devices in this document can be a server, a personal computer (PC), a PAD, a mobile phone, and the like.

The present application further provides a computer program product, when executed on a data processing device, adapted to execute the program codes initialized with method steps of: acquiring video data; parsing the video data to obtain a plurality of consecutive signal-frame images corresponding to the video data; and extracting feature images from the plurality of consecutive single-frame images to compose samples, wherein the feature images are used to summarize content information of the video data, and the samples do not contain redundant image data.

Those skilled in the art will appreciate that embodiments of the present application can be provided as a method, a system, or a computer program product. Thus, the present application can take the form of an entirely hardware embodiment, an entirely software embodiment, or an embodiment in combination of software and hardware. Moreover, the application can take the form of a computer program product embodied on one or more computer-usable storage media (including but not limited to disk storage, a CD-ROM, optical storage, etc.) including computer usable program codes.

The present application is described with reference to flowcharts and/or block diagrams of methods, devices (systems), and computer program products according to embodiments of the present application. It will be understood that each step of the flowchart and/or each block of the block diagrams or combination thereof may be implemented by computer program instructions. These computer program instructions can be provided to a processor of a general purpose computer, a special purpose computer, an embedded processor, or other programmable data processing device to produce a machine, such that instructions that are executed by a processor of a computer or other programmable data processing device can produce a device for implementing the functions specified in one or more steps of the flowchart and/or one or more blocks of the block diagrams.

The computer program instructions can also be stored in a computer readable memory that can direct a computer or other programmable data processing device to operate in a particular manner, such that the instructions stored in the computer readable memory produce an article of manufacture including the instruction device. The instruction device implements the functions specified in one or more steps of the flowchart and/or one or more blocks of the block diagrams.

These computer program instructions can also be loaded onto a computer or other programmable data processing device such that a series of operational steps are performed on a computer or other programmable device to produce computer-implemented processing for execution on a computer or other programmable device. The instructions provide steps for implementing the functions specified in one or more of the flow or in a block or blocks of a flow diagram.

In a typical configuration, a computing device includes one or more processors (CPUs), an input/output interface, a network interface, and a memory.

The memory may include a non-persistent memory, a random access memory (RAM), and/or a non-volatile memory in a computer readable medium, such as a read only memory (ROM) or a flash memory. The memory is an example of a computer readable medium.

Computer readable media includes persistent and non-persistent, removable and non-removable media, which can implement information storage by any method or technology. The information can be computer readable instructions, data structures, modules of programs, or other data. Examples of computer storage media include, but are not limited to, a phase change memory (PRAM), a static random access memory (SRAM), a dynamic random access memory (DRAM), other types such as a random access memory (RAM), a read only memory (ROM), an electrically erasable programmable read only memory (EEPROM), a flash memory or other technology, a compact disk read only memory (CD-ROM), a digital versatile disk (DVD) or other optical storage, a magnetic tape cartridge, magnetic tape storage or other magnetic storage devices or any other non-transportable media can be used to store information that can be accessed by a computing device. As defined herein, computer readable media does not include transient media, such as modulated data signals and carrier waves.

It is also to be understood that the terms "including" or "comprising" or any other variations are intended to encompass a non-exclusive inclusion, such that a process, a method, an article, other elements not explicitly listed, or elements that are inherent to such a process, method, commodity, or equipment. An element defined by the phrase "comprising a . . . " does not exclude the presence of additional identical elements in a process, method, article, or device that comprises the element, without further limitation.

Those skilled in the art will appreciate that embodiments of the present application can be provided as a method, a system, or a computer program product. Thus, the present application can take the form of an entirely hardware embodiment, an entirely software embodiment or an embodiment in combination of software and hardware. Moreover, the application can take the form of a computer program product embodied on one or more computer-usable storage media (including but not limited to disk storage, a CD-ROM, optical storage, etc.) including computer usable program codes.

The above is only an embodiment of the present application and is not intended to limit the application. Various changes and modifications can be made to the present application by those skilled in the art. Any modifications, equivalents, improvements, and so on made within the spirit and scope of the present application are intended to be included within the scope of the appended claims.

What is claimed is:

1. A sample extraction method targeting a video classification problem, comprising:
   acquiring video data;
   parsing the video data to obtain a plurality of consecutive single-frame images corresponding to the video data; and
   extracting feature images from the plurality of consecutive single-frame images to compose samples by:
      dividing the consecutive single-frame images corresponding to the video data into a plurality of image groups, wherein an image group comprises the consecutive single-frame images arranged in chronological order;
      determining the feature images corresponding to the image group by comparing structural similarities between single-frame images in the image group; and
      extracting the feature images corresponding to each of the image groups to compose the samples, wherein the feature images are used to summarize content information of the video data, and the samples do not contain redundant image data; and
   wherein determining the feature images corresponding to the image group by comparing the structural similarities between the single-frame images in the image group comprises:
   selecting any of the single-frame images in the image group as a benchmark image;
   acquiring H single-frame images prior to the benchmark image and H single-frame images after the benchmark image according to an arrangement order of the plurality of consecutive single-frame images in the image group, to form an image set, where H is a positive integer, and 2H+1 is less than a total number of single-frame images contained in one of the image group;
   separately calculating a structural similarity between the benchmark image and each of the single-frame images in the image set to obtain a plurality of similarity values corresponding to the benchmark image;
   performing an averaging operation on the plurality of similarity values corresponding to the benchmark image to obtain an average value of the similarities corresponding to the benchmark image;
   sorting the average values of the similarities corresponding to a plurality of benchmark images according to values from small to large;
   selecting top M average values of similarities from the average values of similarities corresponding to the plurality of benchmark images, according to the values from small to large, where M is the positive integer and is less than the total number of single-frame images contained in the one image group; and
   determining the benchmark images corresponding to the selected average values of the similarities as the feature images.

2. The sample extraction method targeting the video classification problem according to claim 1, further comprising:
   arranging the feature images in chronological order according to optical flow information corresponding to the feature images on a time axis;
   generating optical flow images corresponding to the samples according to an arrangement order of the feature images; and
   adding the optical flow images to training samples.

3. The sample extraction method targeting the video classification problem according to claim 1, further comprising:
   arranging the feature images in chronological order according to optical flow information corresponding to the feature images on a time axis;
   generating optical flow images corresponding to the samples according to an arrangement order of the feature images; and
   adding the feature images to training samples.

4. The sample extraction method targeting the video classification problem according to claim 1, further comprising:
   arranging the feature images in chronological order according to optical flow information corresponding to the feature images on a time axis;
   generating optical flow images corresponding to the samples according to an arrangement order of the feature images;
   adding the optical flow images to training samples; and
   adding the feature images to the training samples.

5. The sample extraction method targeting the video classification problem according to claim 1, wherein, after extracting the feature images corresponding to each of the image groups to compose the samples is performed for a present time, the sample extraction method further comprises:
   marking the feature images extracted for the present time such that the feature images are not selected in a future iteration of the sample extraction method; and
   in the future iteration of the sample extraction method, extracting the feature images from the single-frame images that are not marked in the image group when extracting feature images corresponding to each of the image groups to compose the samples.

6. The sample extraction method targeting the video classification problem according to claim 1, wherein, after extracting the feature images corresponding to each of the image groups to compose the samples is performed for a present time, the sample extraction method further comprises:
   marking the feature images extracted for the present time; and
   when extracting the feature images corresponding to each of the image groups to compose the samples is performed for a next time, respectively multiplying the average values of the similarities corresponding to marked feature images by a growth coefficient, the growth coefficient being used to double the average values of the similarities corresponding to the feature images.

7. A sample extraction device targeting a video classification problem, comprising:
   an acquiring unit configured to acquire video data;
   a parsing unit configured to parse the video data acquired by the acquiring unit to obtain a plurality of consecutive single-frame images corresponding to the video data; and
   an extracting unit configured to extract feature images from the plurality of consecutive single-frame images obtained by the parsing unit to compose samples, wherein the feature images are used to summarize content information of the video data, and the samples do not contain redundant image data;
   a decomposition module configured to divide the plurality of consecutive single-frame images corresponding to the video data into a plurality of image groups, wherein an image group comprises the plurality of consecutive single-frame images arranged in chronological order;
   a determining module configured to determine the feature images corresponding to the image group by comparing structural similarities between single-frame images in the image group, and extract the feature images corresponding to each of the image groups to compose the sample, wherein the determining module comprises:
   a selecting sub-module configured to select any of the single-frame images in the image group as a benchmark image;
   an acquiring sub-module configured to acquire H single-frame images prior to the benchmark image and H single-frame images after the benchmark image according to an arrangement order of the plurality of consecutive single-frame images in the image group, to form an image set, where H is a positive integer, and 2H+1 is less than a total number of single-frame images contained in one image group;
   a calculating sub-module configured to separately calculate a structural similarity between the benchmark image and each of the single-frame images in the image set, to obtain a plurality of similarity values corresponding to the benchmark image;
   the calculating sub-module further configured to perform an averaging operation on the plurality of similarity values corresponding to the benchmark image to obtain an average value of the similarities corresponding to the benchmark image;
   a sorting sub-module configured to sort the average values of the similarities corresponding to a plurality of benchmark images, which are calculated by the calculating sub-module, according to values from small to large;
   the selecting sub-module further configured to select top M average values of similarities from the average values of similarities corresponding to the plurality of benchmark images, according to the values from small to large as sorted by the sorting sub-module, where M is the positive integer and is less than the total number of single-frame images contained in the one image group; and
   a determining sub-module configured to determine the benchmark images corresponding to the selected averages of the similarities as the feature images.

8. The sample extraction device targeting the video classification problem according to claim 7, further comprising:
   a sorting unit configured to arrange the feature images in chronological order according to optical flow information corresponding to the feature images on a time axis;
   a generating unit configured to generate optical flow images corresponding to the samples according to an arrangement order of the feature images arranged by the sorting unit; and
   an adding unit configured to add the optical flow images to training samples.

9. The sample extraction device targeting the video classification problem according to claim 7, further comprising:
   a sorting unit configured to arrange the feature images in chronological order according to optical flow information corresponding to the feature images on a time axis;
   a generating unit configured to generate optical flow images corresponding to the samples according to an arrangement order of the feature images arranged by the sorting unit; and
   an adding unit configured to add the feature images to training samples.

10. The sample extraction device targeting the video classification problem according to claim 7, further comprising:
    a sorting unit configured to arrange the feature images in chronological order according to optical flow information corresponding to the feature images on a time axis;
    a generating unit configured to generate optical flow images corresponding to the samples according to an arrangement order of the feature images arranged by the sorting unit;
    an adding unit configured to add the optical flow images to training samples; and
    the adding unit further configured to add the feature images to the training samples.

11. The sample extraction device targeting the video classification problem according to claim 7, wherein the sample extraction device further comprises:
    a marking module configured to, after the feature images corresponding to each of the image groups is extracted, mark the feature images extracted for a present time such that the feature images are not selected in a future iteration of extraction of feature images from the video data; and
    an extracting module configured to, in the future iteration of extraction of feature images from the video data, extract the feature images from the single-frame images that are not marked in the image group when extracting the feature images corresponding to each of the image groups to compose the samples.

12. The sample extraction device targeting the video classification problem according to claim 7, wherein the determining module further comprises:
    a marking sub-module configured to mark the feature images extracted for a present time after extracting the feature images corresponding to each of the image groups to compose the samples is performed for the present time; and
    a processing sub-module configured to, when extracting the feature images corresponding to each of the image groups to compose the samples is performed for a next time, respectively multiply the average values of the similarities corresponding to marked feature images by a growth coefficient, the growth coefficient being used to double the average values of the similarities corresponding to the feature images.

13. An electronic device, comprising:
    a hardware processor; and a program stored on memory and operable on the hardware processor that, when the processor executes the program, the hardware processor directs the electronic device to:

acquire video data;

parse the video data to obtain a plurality of consecutive single-frame images corresponding to the video data; and extract feature images from the plurality of consecutive single-frame images to compose samples by:

dividing the consecutive single-frame images corresponding to the video data into a plurality of image groups, wherein an image group comprises the consecutive single-frame images arranged in chronological order;

determining the feature images corresponding to the image group by comparing structural similarities between single-frame images in the image group; and extracting the feature images corresponding to each of the image groups to compose the samples, wherein the feature images are used to summarize content information of the video data, and the samples do not contain redundant image data; and wherein determining the feature images corresponding to the image group by comparing the structural similarities between the single-frame images in the image group comprises:

selecting any of the single-frame images in the image group as a benchmark image;

acquiring H single-frame images prior to the benchmark image and H single-frame images after the benchmark image according to an arrangement order of the plurality of consecutive single-frame images in the image group, to form an image set, where H is a positive integer, and 2H+1 is less than a total number of single-frame images contained in one of the image group;

separately calculating a structural similarity between the benchmark image and each of the single-frame images in the image set to obtain a plurality of similarity values corresponding to the benchmark image;

performing an averaging operation on the plurality of similarity values corresponding to the benchmark image to obtain an average value of the similarities corresponding to the benchmark image;

sorting the average values of the similarities corresponding to a plurality of benchmark images according to values from small to large;

selecting top M average values of similarities from the average values of similarities corresponding to the plurality of benchmark images, according to the values from small to large, where M is the positive integer and is less than the total number of single-frame images contained in the one image group; and determining the benchmark images corresponding to the selected average values of the similarities as the feature images.

14. The electronic device according to claim 13, wherein the electronic device is further directed to:

arrange the feature images in chronological order according to optical flow information corresponding to the feature images on a time axis;

generate optical flow images corresponding to the samples according to an arrangement order of the feature images; and add the optical flow images to training samples.

15. The electronic device according to claim 13, wherein the electronic device is further directed to:

arrange the feature images in chronological order according to optical flow information corresponding to the feature images on a time axis;

generate optical flow images corresponding to the samples according to an arrangement order of the feature images; and add the feature images to training samples.

16. The electronic device according to claim 13, wherein the electronic device is further directed to:

arrange the feature images in chronological order according to optical flow information corresponding to the feature images on a time axis;

generate optical flow images corresponding to the samples according to an arrangement order of the feature images;

add the optical flow images to training samples; and add the feature images to the training samples.

17. The electronic device according to claim 13, wherein the electronic device is further directed to train a video classification model using the samples.

18. The electronic device according to claim 17, wherein training the video classification model using the samples comprises executing a deep learning routine.

19. The method according to claim 1, further comprising training a video classification model using the samples.

20. The method according to claim 19, wherein training the video classification model using the samples comprises executing a deep learning routine.

* * * * *